United States Patent [19]
Kudo et al.

[11] Patent Number: 5,223,349
[45] Date of Patent: Jun. 29, 1993

[54] COPPER CLAD ALUMINUM COMPOSITE WIRE

[75] Inventors: Kazunao Kudo; Kazuo Yamazaki, both of Hyogo, Japan

[73] Assignee: Sumitomo Electric Industries, Ltd., Osaka, Japan

[21] Appl. No.: 891,258

[22] Filed: Jun. 1, 1992

[51] Int. Cl.$^5$ .............................................. B32B 15/20
[52] U.S. Cl. ...................................... 428/652; 428/931
[58] Field of Search .............. 428/652, 607, 931, 925

[56] References Cited

U.S. PATENT DOCUMENTS

| | | | |
|---|---|---|---|
| 723,717 | 3/1903 | Nicholson | 428/652 |
| 2,700,212 | 1/1959 | Flynn et al. | 428/652 |
| 3,381,366 | 5/1968 | Winter | 428/652 |
| 3,463,620 | 8/1969 | Winter | 428/652 |
| 3,514,572 | 5/1970 | Toritani et al. | 219/146.22 |
| 3,570,118 | 3/1971 | Reynolds et al. | 29/599 |
| 3,616,982 | 11/1971 | Dion | 228/5.1 |
| 3,621,188 | 11/1971 | Joseph | 219/146.22 |
| 3,810,287 | 5/1974 | Pryor et al. | 428/607 |
| 3,854,193 | 12/1974 | Yamaguchi et al. | 228/130 |
| 3,877,885 | 4/1975 | Sexton | 428/607 |
| 3,926,573 | 12/1975 | Sexton | 428/652 |
| 3,939,299 | 2/1976 | Raw et al. | 428/652 |
| 4,560,625 | 12/1985 | Kaifu et al. | 428/654 |

FOREIGN PATENT DOCUMENTS

| | | | |
|---|---|---|---|
| 52-24909 | 2/1977 | Japan | 428/651 |
| 54-155915 | 12/1979 | Japan | 428/652 |
| 1-295841 | 11/1989 | Japan | 428/652 |

OTHER PUBLICATIONS

Standard Specification for Copper-Clad Aluminum Wire, ASTM, B 566-72, Apr. 1988, pp. 1-4.

*Primary Examiner*—John Zimmerman
*Attorney, Agent, or Firm*—Cushman, Darby & Cushman

[57] ABSTRACT

A copper-clad aluminum composite wire has a core that is made of an Al-Mg alloy and circumferentially clad with copper or a copper alloy. The aluminum alloy is composed of 1.5 to 10.0 percent by weight of Mg, additives such as Cr and Mn, ordinary impurities, and aluminum whose content is such as to form the rest of the alloy composition. The copper or the copper alloy forms 20 to 40% of the cross-sectional area of the copper-clad aluminum composite wire. Such core material is drawn to reduce the cross-sectional area by 20% or more using a die whose half angle $\alpha$ is from 15 to 30 degrees to obtain an cladding wire; the cladding wire is further drawn to reduce the cross-sectional area by 70% or more using a drawing die whose half angle $\alpha$ is from 4 to 15 degrees at least once; and the thus drawn wire is subjected to annealing at temperatures from 200° to 400° C. for from one minute to 24 hours.

2 Claims, 3 Drawing Sheets

FIG. 4a  FIG. 4b  FIG. 4c  FIG. 4d
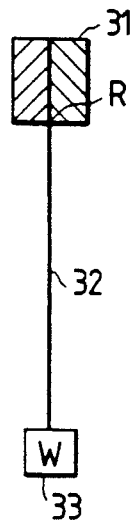
(ONCE)   (SECOND)
FIG. 5
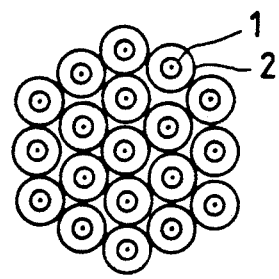

COPPER CLAD ALUMINUM COMPOSITE WIRE

BACKGROUND OF THE INVENTION

The invention relates to lightweight and very strong copper-clad aluminum composite wire (hereinafter referred to as "Cu/Al composite wire") and a method of manufacturing such Cu/Al composite wire, which is used for internal conductors for coaxial cables, electromagnetic shield braided wire for coaxial cables, electric wiring cables for airplanes, automobiles, electric automobiles, portable VTRs and TV sets, voice coards for speakers, magnet wire, and the like.

FIG. 1 is a sectional view of a Cu/Al composite wire. Reference numeral 1 designates an aluminum core; and 2, a copper cladding layer around the aluminum core 1.

Having such a makeup, the copper cladding layer in the conventional Cu/Al composite wire generally forms from 5 to 20% of the cross-sectional area of the composite wire. The aluminum core material is a high-purity aluminum alloy whose purity is 99.9% or more or an Al-Fe alloy containing 0.9 to 2.5 percent iron (see Japanese Patent Unexamined Publication No. 53-110082). Such Cu/Al composite wire had a conductivity of 60 to 70% IACS (International Annealed Copper Standard), a specific gravity of 3.0 to 3.95, a tensile strength of 10 to 20 kgf/mm$^2$ (soft-drawn) and 20 to 35 kgf/mm$^2$ (hard-drawn) (American Society for Testing Materials (ASTM) B566-88).

As described above, the coverage of the copper cladding layer is from 5 to 20% at the cross-sectional area. Often the copper cladding layer breaks to expose the aluminum core when the composite wire is soldered to printed circuits or boards, thus causing defective connections. Also, adjusting, stranding, and handling of the wire in thin diameter during the intermediate process may cause damage to the copper cladding layer, leading to exposure of the aluminum core, which the becomes corroded or breaks, etc.

On the other hand, if the copper clad takes up more than 20% of the total cross-sectional area of the wire, the strength of the core against the copper clad layer is impaired in the case where the core material is a high-purity aluminum alloy material. In this case, the aluminum core may break easily when the wire is drawn. Consequently, drawing of wire to obtain small sizes is difficult. Also, when high-purity aluminum alloy is used, even if the copper forms less than 20% of the cross-sectional area of the wire, the tensile strength is small (35 kgf/mm$^2$ or less). Such a wire exhibits insufficient strength which is fatal as a wiring conductor when drawn to be 0.15 mm$\phi$ or less in diameter. In addition, the conventional Cu/Al composite wire has exhibited conspicuous inferiority in corrosion resistance to salt water at the end faces thereof compared with ordinary copper wire. Further, although various types of copper-cladding materials are used while utilizing the electromagnetic shielding property of copper, no study has been made on the Cu/Al composite wire.

SUMMARY OF THE INVENTION

The invention has been made in view of the above circumstances. Accordingly, an object of the invention is to provide copper-clad aluminum composite wire and a method of manufacturing such wire.

To achieve the above object, according to a first aspect of the invention, a copper-clad aluminum composite wire has a core that is made of an Al-Mg alloy and circumferentially clad with copper. The aluminum alloy is composed of 1.5 to 10.0 percent by weight of Mg, partial additives such as Cr and Mn, ordinary impurities, and aluminum, with the aluminum being in such a content as to form the rest of the alloy composition. The copper whose purity is 99.9% or more forms from 20 to 40% of the cross-sectional area of the wire.

According to a second aspect of the invention, a method of manufacturing a copper-clad aluminum composite wire comprises the steps of: when cold-cladding a core material with copper in the above-mentioned composition, drawing the copper at a percent reduction of 20% or more using a cladding die (see FIG. 6) whose half angle $\alpha$ is from 15° to 30° to obtain a cladding wire; drawing the cladding wire for elongation at a percent reduction of 70% or more using a drawing die whose half angle $\alpha$ is from 4° to 15° at least once; and subjecting the thus drawn wire to an annealing process.

The diameter of the aluminum alloy core is 6.0 mm$\phi$ or more. When the aluminum alloy core is formed into the cladding wire, the cladding die has a half angle $\alpha$ of from 15° to 30° and the length d of the bearing zone is $D/6 \leq d \leq D/4$ (where D is the diameter of the die).

The annealing process is carried out at temperatures from 200° to 400° C. for from one minute to 24 hours. In the method, the drawn wire may be further subjected to a cold drawing process for elongation at a percent reduction of 50% or more at least once after the annealing process.

The copper-clad aluminum composite wire of the invention uses as an aluminum core 1 in FIG. 1 an Al-Mg alloy composed of 1.5 to 10.0 percent by weight of Mg, partial additives such as Cr and Mn, ordinary impurities, and aluminum, the aluminum being in such a content as to form the rest of the alloy composition. Such aluminum core 1 is cladding with copper whose purity is 99.9% or more so that the copper forms 20 to 40% of the cross-sectional area of the wire.

In general, the Al-Mg alloy of the present invention includes Zn of about 0.05 wt %, Cu of about 0.02 wt %, Cr of about 0.05 wt %, Mn of about 0.05 wt %, Fe of about 0.1–0.2 wt %, and Si of about 0.02 wt % other than Al and Mg.

The inventors have studied the aluminum core material of the Cu/Al composite wire and have obtained the following findings.

(1) If a high-purity aluminum alloy such as described above (JIS1000 Series or an aluminum alloy having a high purity of 99.9% or more) is used, strength of the core is so low compared with that of the copper cladding layer that and breakage originates frequently from the core during the drawing process when producing small-diameter wire. The produced wire has low bending resistance and low corrosion resistance to salt water.

(2) Even if an Al-Cu alloy (JIS2000 Series) is subjected first to an ordinary softening process in which the alloy is heated to 250° to 400° C. and cooled, and then a drawing process for elongation, strength of the core is so low as to be frequently broken during the drawing process to produce small-diameter wire. The bending resistance is also low. To improve the strength, the Al-Cu alloy is usually subjected to the T6 thermal treatment, in which the alloy is subjected to solution treatment and aging treatment. The temperature at which the solution treatment is carried out, is 400° C. or more, thus producing brittle intermetallic compounds at the boundary between Cu and Al. This becomes the cause of breakage of wire, making this alloy unsuitable as a core material. The corrosion resistance of the alloy to salt water is noticeably poor, making the alloy unsuitable.

(3) An Al-Mn alloy (JIS3000 Series) may have higher strength depending on how much Mg is added, but the strength does not make this alloy suitable enough. The addition of Mn disadvantageously increases the softening temperature; a Mn-added product (1.2% Mg) requires that the softening temperature be 400° C. or more, thereby similarly causing brittle intermetallic compounds to be produced at the boundary between Cu and Al. However, the corrosion resistance to salt water is fairly improved.

(4) An Al-Si alloy (JIS4000 Series), exhibiting poor drawability to small-diameter wire, is thus unsuitable as a core material. The corrosion resistance to salt water is also extremely unsatisfactory.

(5) An Al-Mg alloy (JIS5000 Series) has been found suitable as a core material of the Cu/Al composite wire of the invention. However, if the addition of Mg is less than 1.5 percent by weight, strength of the core is inadequate and becomes lower than that of the copper cladding layer, which may cause the wire to break easily. If Mg is added by 10 percent by weight or more, although the strength becomes high, ductility of the core material is decreased, exhibiting low drawability to 300 $\mu$m or less and thus making the alloy unsuitable as the core material. The addition of 1.5 to 10.0 percent by weight of Mg makes the alloy stronger than the circumferentially cladding copper layer, and the softening process can be carried out at the temperature from 200° to 400° C. in the course of elongation process, so that the drawability to 300 $\mu$m or less id improved to a remarkable degree.

(6) An Al-Mg-Si alloy (JIS6000 Series) is unsuitable for its poor strength obtained under ordinary heat treatment and drawing processes. A solution treatment at 450° C. or more improves the strength but, at the same time, brittle intermetallic compounds are similarly produced at the core boundary to the copper cladding layer, thus making the alloy unsuitable.

From the above findings, Al-Mg alloys having 1.5 to 10.0 percent by weight of Mg (containing the addition of Cr and Mn) are suitable as a material of the aluminum core, particularly, Al-Mg alloys having 4 to 6 percent by weight of Mg are optimum.

The ratio in cross-sectional area of Cu to Al of the Cu/Al composite wire will be discussed. If the copper cladding layer forms less than 20% of the total crosssectional area of the wire, the copper cladding layer is broken to expose the aluminum core as described previously, causing wire breakage and defective connections. Since an Al-Mg alloy used as a core material in the Cu/Al composite wire of the invention has low conductivity, the makeup of the wire in which the copper cladding layer takes up less than 20% may lead to a case where conductivity of the Cu/Al composite wire is smaller than 40% IACS, making the wire unsuitable as a conductor. On the other hand, if the copper cladding layer forms more than 40% of the total cross-sectional area of the wire, the specific gravity becomes more than 5.2 thus reducing the lightweight advantage making the wire unsuitable. Therefore, by setting the ratio in cross-sectional area taken up by the copper cladding layer from 20% to 40%, the conductivity problem is eliminated, and the specific gravity can be confined to a value of less than 5.2, which contributes to the lightweight benefit of the wire.

Considering the electromagnetic shielding property, if the purity of copper used in the copper cladding layer is less than 99.9%, the conductivity of the wire is decreased together with the shielding property. Also, when the copper cladding layer forms less than 20%, particularly less than 10%, of the cross-sectional area, the shielding effect tends to decrease greatly, while the shielding effect remains unchanged when the copper cladding layer forms 40% or more.

Since purities of copper of the copper cladding layer less than 99.9% reduce conductivity of the Cu/Al composite wire, such copper is unsuitable.

Since composite clad wire such as that of the invention is used where a size of 100 $\mu$m or less is required, the cladding material and the core material are preferably bonded metallurgically to some extent. Any clearance between these materials makes drawing into thin wire difficult. It has been found that success in drawing owes much to three factors: the cladding method employed when a core material having a certain thickness is clad with a cladding material; to the subsequent drawing method for elongation; and to the annealing conditions. A core material, which is an aluminum alloy, in the invention preferably has a diameter of 6.0 mm or more for satisfactory metallurgical bonding. When the materials are passing through a cladding die whose half angle $\alpha$ is from 15° to 30° to prepare cladding wire, the cladding material is elongated to thereby generate slide resistance on the core material, i.e., an Al alloy, which increases the degree of contact. In contrast thereto, when the half angle $\alpha$ of the die is less than 15°, particularly, less than 10°, the slide resistance is so small that the cladding material is not brought into sufficient contact with the core material. If $\alpha$ exceeds 30°, particularly, 35° or more, the cladding material is drawn so excessively as to be easy to break. Consequently, it is preferable to set the half angle $\alpha$ of the die between 15° and 30°. Further, the use of the die whose half angle falls within the above range allows a predetermined ratio in cross-sectional area of the cladding material to be obtained. In addition, it is important to set the length d of the bearing zone of this die between D/6 and D/4 (D is the diameter of the die). When d is less than D/6, the surface pressure at the time that the cladding material is slid is insufficient, thus causing insufficient contact. If d is more than D/4, the die surface is subjected to excessive wear, thus not only deteriorating the life of the die but also causing breakage of the cladding material, tucking, and the like.

Still further, in drawing the obtained cladding wire for elongation, it is preferable that after the wire is drawn at a percent reduction of 70% or more using a drawing die whose half angle $\alpha$ is from 4° to 15°, the reduced wire is annealed at temperatures from 200° to 400° C. to improve the bonding property between the core material and the cladding material. Half angles being less than 4° cause the die to be worn greatly, while half angles in excess of 15° cause the cladding layer to be out of position, which is likely to result in tucking. Annealing temperatures below 200° C., particularly below 150° C., are not enough to induce mutual diffusion, while an annealing process at a temperature in excess of 400° C. for a long time produces brittle intermetallic compounds, which leads to easy breakage of wire. Thus, such wire cannot make a satisfactory hoop. Further, the annealing time is preferably from one minute to 24 hours. Annealing for less than one minute is not enough to obtain the effect of mutual diffusion, while annealing that is longer than 24 hours is too expensive and does not provide performance improvement that is commensurate with the expended cost.

After such annealing, the wire is cold-drawn to reduce the cross-sectional area by 50% or more at least once, so that the core material and the cladding material can be bonded with no clearance therebetween. The strength and bending resistance of the Cu/Al composite wire can thus be improved.

According to such a method, tensile strength of the Cu/Al composite wire is 30 kgf/mm² or more, and even as large as 60 kgf/mm². Even if the core material is softened at temperatures from 200° to 400° C., the tensile strength is between 20 and 35 kgf/mm².

BRIEF DESCRIPTION OF THE DRAWINGS

FIGS. 4(a) to 4(d) are diagrams illustrative of a bending test;

FIG. 5 is a horizontal sectional view of stranded Cu/Al wire;

DETAILED DESCRIPTION OF THE PREFERRED EMBODIMENTS

Figure 1:
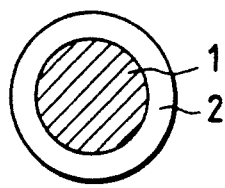
FIG. 1 is a horizontal sectional view of Cu/Al composite wire.
Figure 2:
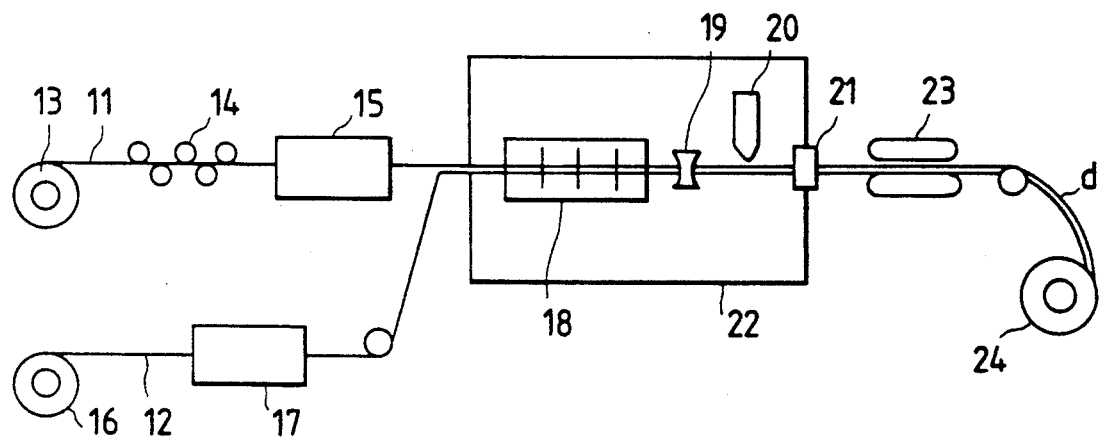
FIG. 2 is a diagram illustrative of an apparatus for manufacturing the Cu/Al wire.

FIG. 2 is a diagram illustrative of an apparatus for manufacturing Cu/Al wire.

An aluminum core material 11 is paid off from a core material supply block 13 and straightened by a straightener 14. The straightened core material is cleaned by a surface cleaning unit 15 and introduced into a casting die 18. Simultaneously, a copper tape 12 paid off from a copper tape supply block 16 is similarly cleaned by a surface cleaning unit 17 and introduced into the casting die 18 so as to be laid along the core material 11. The thus laid copper tape 12 in the casting die 18 is cast to clad the core material 11 concentrically. The side ends of the copper tape 12 to be jointed is butt-welded by a TIG welder 20. The thus welded materials are then formed into a cladding wire d by a cladding die 21 and rewound by a rewinder 24. In the form of cladding wire the aluminum core material 11 and the copper tape 12 are in intimate mechanical contact with each other. In FIG. 2, reference numeral 19 designates a squeeze roller; 22, a shielded container for forming nonoxide atmosphere; and 23, a rewinding capstan.

Figure 3:
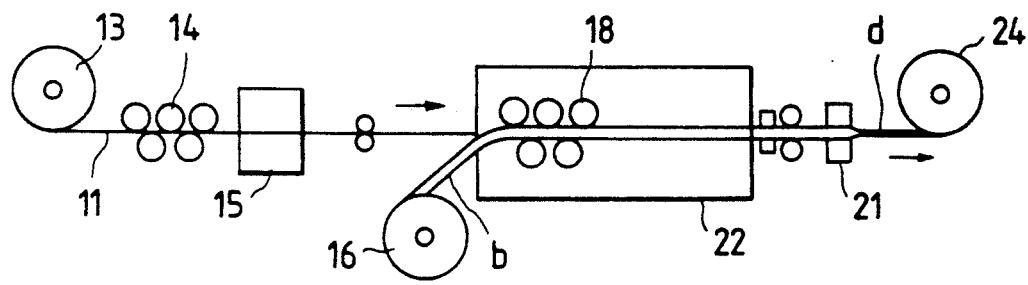
FIG. 3 is a diagram illustrative of an apparatus for manufacturing the Cu/Al wire when a tubular claddingding material is used.
Figure 6:
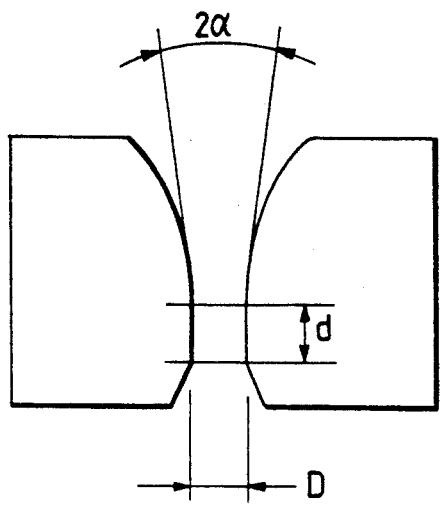
FIG. 6 is a diagram illustrative of a die.

FIG. 3 is a diagram illustrative of an apparatus for manufacturing Cu/Al composite wire when a tubular claddingding material is used.

Cu/Al composite wires in each of which the copper clad layer forms 30% of the cross-sectional area of the wire were obtained by cladding and drawing while using the apparatus for manufacturing Cu/Al composite wire shown in FIG. 2 under the following conditions. The core materials were the aluminum alloy wires made of: (a) pure aluminum (JIS1050); (b) Al-Cu alloy (JIS2011); (c) Al-Mn alloy (JIS3003); (d) Al-Si alloy (JIS4047); (e) Al-Mg-Si alloy (JIS6061); (f) Al-Mg alloy (JIS5056) and (g) Al-Mg alloy containing 0.9 percent by weight of Mg (JIS5005) ((f) and (g) were core materials of the invention). The diameter of each core wire was set to 8.5 mmφ. The cladding material was a copper tape of 1.0 mm thick and 55 mm wide made of oxygen free copper (99.99%). A cladding die whose diameter is 10.2 mmφ and whose half angle α is 30° was used to clad and draw the materials.

Further, (h) a Cu/Al composite wire in which the copper clad layer takes up 42% of the cross-sectional area of the wire was produced by cladding and drawing the core material Al-Mg alloy (JIS5056) and a cladding material copper tape of 1.4 mm thick and 55 mm wide made of oxygen free copper. In this case, a cladding die whose diameter was 11.2 mmφ and whose half angle α was 25° was used. Still further, a Cu/Al composite wire in which the copper cladding layer forms 16.5% of the cross-sectional area of the wire was obtained by cladding and drawing the core material (JIS5056) and a copper tape of 0.5 mm thick and 40 mm wide made of oxygen free copper. In this case, a cladding die whose diameter was 9.3 mmφ, whose half angle α was 25°, and whose bearing length was 1.9 mm was employed.

These Cu/Al composite wires were cold-drawn to reduce their diameter to 4.0 mmφ and then annealed at 300° C. for one hour. The annealed wires were cold-drawn again so that their diameter was reduced to 1.0 mmφ and annealed again at 300° C. for one hour. The thus heat-treated wires were subjected to cold drawing to reduce the diameter to as thin as 0.15 mmφ.

While the Cu/Al composite wires using the Al-Cu alloy and the Al-Mg-Si alloy as the core materials were subjected to a solution treatment at 520° C. as an additional heat treatment to improve the strength of the 1.0 mmφ semi-finished wires, brittle Cu-Al intermetallic compounds were produced at the boundary and this caused breakage of the wires. Consequently, the treatment was suspended at this point.

The Cu/Al composite wires whose diameter reached 0.15 mmφ without breakage were subjected to mechanical property tests such as a tensile strength test (kgf/mm²), a bending resistance test shown in FIGS. 4(a)-4(b) as well as a soldering test. Further, a salt spray test was conducted on these wires in the atmosphere using 5% salt water (pH=6.5 to 7.2) at 35°±1° C. in spraying amounts of from 0.5 to 3.0 cc/hour.

FIGS. 4(a) to 4(d) are diagrams illustrative of the bending test. An end of a sample piece of Cu/Al composite wire 32 is clamped between a pair of steel blocks 31, each having a roundness value of corner (R) of 0.5 mm, and a weight 33 weighing 50 g is suspended on the other end (FIG. 4(a)). Then, the steel blocks 31 were tilted 90° toward the right as shown in FIG. 4(b) to bend the composite wire 32. This operation was counted as one bending. The steel blocks 31 were returned in the original position as shown in FIG. 4(c) and were then tilted toward the left to give a second bending to the composite wire 32 as shown in FIG. 4(d). By repeating this operation, the number of bendings was counted until the wire was broken.

The core material composition, processed states, and mechanical properties of the above-mentioned Cu/Al composite wires are shown in Table 1. For reference, comparative examples of a single strand of titanium wire, a single strand of duralumin wire, and a single strand of tough-pitch wire, whose diameter is 0.15 mmφ, are also presented.

TABLE 1

| No. | JIS No. | Cu | Si | Mn | Mg | Cr | Al | Cu coverage (%) | Specific gravity | Conductivity IACS % |
|---|---|---|---|---|---|---|---|---|---|---|
| 1 | 1050 | ≦0.05 | ≦0.25 | ≦0.05 | ≦0.05 | — | ≧99.5 | 30 | 4.5 | 71 |
| 2 | 2011 | 5.5 | 0.2 | — | — | — | Remaining content | " | 4.7 | 58 |
| 3 | 2011 | 5.5 | 0.2 | — | — | — | Remaining content | " | 4.7 | 58 |
| 4 | 3003 | 1.1 | 0.2 | 1.2 | — | — | Remaining content | " | " | 65 |
| 5 | 4047 | 0.1 | 12 | 0.1 | 0.05 | — | Remaining content | " | " | 55 |
| 6 | 6061 | 0.3 | 0.6 | 0.1 | 1.0 | 0.2 | Remaining content | " | " | 61 |
| 7 | 6061 | 0.3 | 0.6 | 0.1 | 1.0 | 0.2 | Remaining content | " | " | 61 |
| (8) | 5056 | 0.05 | 0.1 | 0.1 | 5.2 | 0.10 | Remaining content | 30 | 4.5 | 52 |
| (9) | 5052 | 0.10 | 0.25 | 0.1 | 2.5 | 0.20 | Remaining content | 25 | 4.3 | 52 |
| 10 | 5056 | 0.05 | 0.1 | 0.1 | 5.2 | 0.10 | Remaining content | 16.5 | 3.7 | 39 |
| 11 | 5005 | 0.08 | 0.2 | 0.1 | 0.8 | — | Remaining content | 30 | 4.5 | 66 |
| 12 | 5056 | 0.05 | 0.1 | 0.1 | 5.2 | 0.10 | Remaining content | 42 | 5.3 | 59 |
| 13 | Single-strand titanium wire | | | | | | | | 4.5 | 2.2 |
| 14 | Single-strand duralumin wire (JIS 2011) | | | | | | | | 2.8 | 40 |
| 15 | Single-strand tough-pitch copper wire | | | | | | | | 8.9 | 100 |

| No. | Drawability up to 0.15 mmφ | Tensile strength at 0.15 mmφ (kgf/mm²) | Bending test (50 g, 0.5 mmR, right-angle bending) | solderability | 500-hour salt spray test — End face | 500-hour salt spray test — Surface |
|---|---|---|---|---|---|---|
| 1 | Δ Frequently broken | 22 | 35 | ○ | Al core was corroded by 8 mm | No corrosion |
| 2 | Δ Frequently broken | 29 | 39 | ○ | Al core was corroded by 35 mm | No corrosion |
| 3 | X No. 2 was subjected to T6 treatment (500° C. → water · cooled → 170° C. × 10 Hr), but embrittled and broken. | Cannot be measured | Cannot be measured | — | — | — |
| 4 | Δ Frequently broken | 27 | 40 | ○ | Al core was corroded by 3 mm | No corrosion |
| 5 | Δ Frequently broken | 36 | 49 | ○ | Al core was corroded by 25 mm | No corrosion |
| 6 | Δ Frequently broken | 29 | 37 | ○ | Al core was corroded by 9 mm | No corrosion |
| 7 | X No. 6 was subjected to T6 treatment (500° C. → water · cooled → 170° C. × 10 Hr), but embrittled and broken. | Cannot be measured | Cannot be measured | — | — | — |
| (8) | ○ Good drawability | 48 | 81 | ○ | Al core was corroded by 0.8 mm | No corrosion |
| (9) | ○ Good drawability | 47 | 80 | ○ | Al core was corroded by 1.0 mm | No corrosion |
| 10 | ○ Good drawability | 54 | 98 | Δ Cu layer easy to break | Al core was corroded by 0.8 mm | No corrosion |
| 11 | Δ Frequently broken | 28 | 40 | ○ | Al core was corroded by 4.5 mm | No corrosion |
| 12 | ○ Good drawability, but not light | 40 | 71 | ○ | Al core was corroded by 0.8 mm | No corrosion |
| 13 | X Poor drawability | 75 | 105 | X | ○ | No corrosion |
| 14 | Δ Frequently broken, T6 treatment done. | After T6 treatment 50 | 69 | X | Corroded along the total length with no trace of original form. | Same as left |
| 15 | ○ Good drawability, but heavy | 46 | 40 | ○ | ○ | No corrosion |

Note:
Nos. (8) and (9) are Cu/Al composite wires of the invention.
Nos. 13, 14 and 15 are comparative single-strand wire samples.

An ordinary electric conductor whose total cross-sectional area was from 0.34 to 0.5 mm² such as shown in FIG. 5 was prepared by stranding a total of 19 single solid conductors of each of the Cu/Al composite wires of the invention (Nos. 8 and 9), the Cu/Al composite wires (Nos. 10 and 12), the duralumin wire (NO. 14) and the tough-pitch copper wire (No. 15) as comparative examples. The mechanical properties of these electric wires are shown in Table 2.

While the tensile load (kgf) and soldering test conditions are the same as applied to the single wires, the bending test and salt spray test conditions were the same except that the weight was 1 kg in the bending test and the ends were covered with waterproof caps in the salt spray test.

Cu layer coverage, is not only inferior to the tough-pitch copper wire in current use in terms of tensile load, but also heavier.

Figure 7:
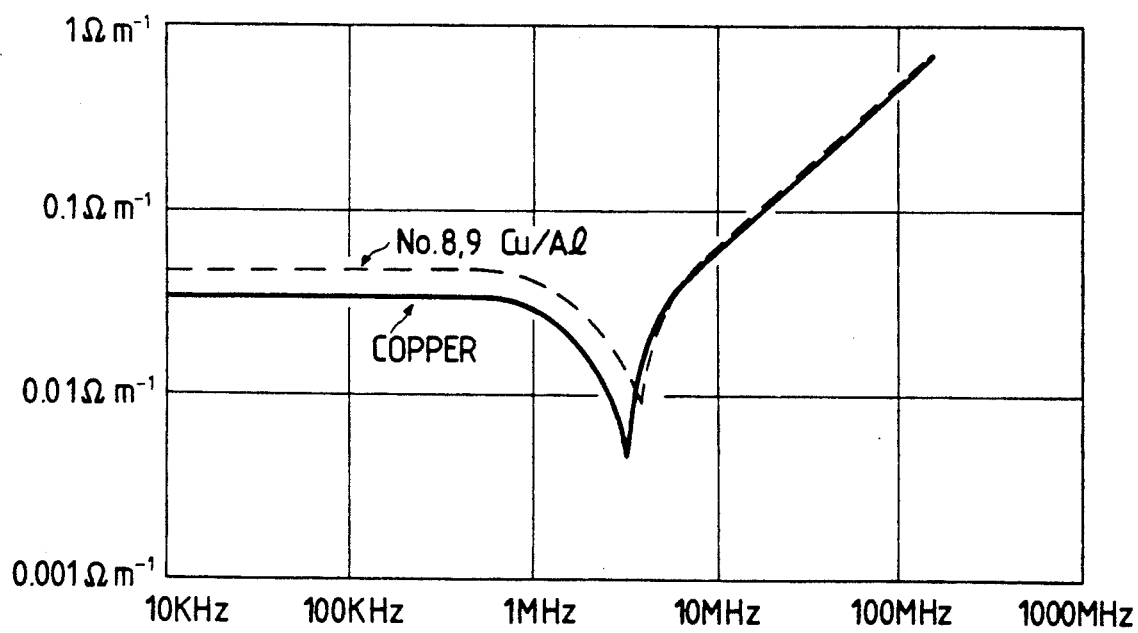
FIG. 7 is a graph showing shield effects of the Cu/Al wire.

FIG. 7 shows the shield effects of the sample piece

TABLE 2

| | No. | Material of conductor | Makeup | Outside diameter (mm) | Conductivity (%/IACS) | Tensile load (kgf/mm$^2$) | Weight (g/m) | Number of bendings | Solderability | Salt spray characteristic (Surface) |
|---|---|---|---|---|---|---|---|---|---|---|
| Wires of the invention | 8 | Cu/Al composite wire | 19 conductors/0.15 mm$\phi$ | 0.76 | 52 | 17.8 | 1.66 | 415 | O | O |
| | 9 | " | 19 conductors/0.15 mm$\phi$ | " | " | 17.0 | 1.59 | 403 | O | O |
| Comparative wires | 12 | " | 19 conductors/0.15 mm$\phi$ | " | 60 | 14.9 | 1.96 | 360 | O | O |
| | 14 | Duralumin | 19 conductors/0.15 mm$\phi$ | " | 40 | 17.5 | 1.04 | 348 | X | X |
| | 15 | Tough-pitch copper | 19 conductors/0.15 mm$\phi$ | " | 99 | 16.8 | 3.29 | 359 | O | O |
| | 10 | Cu/Al composite wire | 19 conductors/0.15 mm$\phi$ | " | 38 | 19.8 | 1.37 | 501 | Δ | X |

As is apparent from Table 1, the Cu/Al composite wire of the invention is comparable to titanium wire with respect to the specific gravity. The wire of the invention is about half the weight of the single-strand copper wire with a satisfactory conductivity that is larger than single-strand titanium and duralumin wires.

The simple heat treatment at below 400° C. and drawing process contributes to making strength of the core material greater than that of the copper cladding layer, thus providing satisfactory drawability to produce wire whose diameter is 0.15 mm$\phi$. In addition, the tensile strength is increased appropriately while ensuring acceptable bending resistance. This means that the composite wire of the invention is effective as a conductor used at locations to which bending and bending vibration are added.

Since the composite wire of the invention has such a ratio in cross-sectional area of the copper cladding layer to the core as to allow soldering heat to be released, thereby ensuring satisfactory soldering reliability.

It is found from Table 2 that the Cu/Al composite wire of the invention has the following advantages. Compared with the stranded tough-pitch copper wire (No. 15) as the ordinary electric wire in current use, the composite wire obtained by the invention not only has greater tensile strength and better bending resistance but also is lighter and equal in solderability and salt spray characteristic.

Since the No. 10 stranded Cu/Al composite wire had remarkably low conductivity and was thin because of the small Cu layer coverage, the Cu layer was damaged during stranding or handling, and the damaged portion was locally corroded or broken due to salt water spraying. Thus, this wire (No. 15) was unsuitable. The No. 12 stranded Cu/Al composite wire, because of the higher wires. It was found for the first time that the Nos. 8 and 9 Cu/Al composite wires shown in Table 1 exhibited a characteristic similar to copper wire in high frequencies.

Therefore, the Cu/Al composite wire of the invention is extremely effective when used in fields such as requiring a small diameter, a certain tensile strength, lightness (lighter than copper wire) and soldering reliability at end surfaces; e.g., internal conductors of coaxial cables, electromagnetic shield braided wire, voice cords for tweeters, wiring conductors for airplanes and automobiles, wiring conductors of domestic appliances such as portable VTRs and TV sets, magnet wire for motors, and the like.

Since long and continuous wire can be obtained by the invention, the Cu/Al composite wire may be used as a filler material for use in TIG (tungsten inert gas) and MIG (metal inert gas) cladding by welding.

What is claimed is:

1. A cooper-clad aluminum composite wire, comprising:

a core made of an Al-Mg alloy consisting essentially of about 1.5 to 10.0 percent by weight of Mg, additives of Cr and Mn, ordinary impurities, and aluminum, a content of said aluminum being such as to form the rest of said Al-Mg alloy; and a copper or copper alloy cladding layer covering said core, said copper or copper alloy layer forming 20 to 40% of a cross-sectional area of said copper-clad aluminum composite wire.

2. A copper-clad aluminum composite wire according to claim 1, wherein said cladding layer is made of copper or copper alloy with a purity of 99.9% or more.

* * * * *